(12) United States Patent
Yang et al.

(10) Patent No.: US 9,527,174 B2
(45) Date of Patent: Dec. 27, 2016

(54) METHOD FOR MACHINING METALLIC MEMBER USING LATHING AND MILLING

(71) Applicants: FU DING ELECTRONICAL TECHNOLOGY (JIASHAN) CO.,LTD., Zhejiang (CN); HON HAI PRECISION INDUSTRY CO., LTD., New Taipei (TW)

(72) Inventors: Ming-Lu Yang, New Taipei (TW); Tian-En Zhang, Jiashan (CN); Wei-Chuan Zhang, Jiashan (CN); Jian-Shi Jia, Jiashan (CN); Yang-Mao Peng, Jiashan (CN); Jian Qu, Jiashan (CN); Feng-Hua Chen, Jiashen (CN); Zhen-Guang Xu, Jiashan (CN); Jing-Shuang Sui, Jiashan (CN); Da-Qing Zhuang, Jiashan (CN); Jie Li, Jiashan (CN); Yi Liu, Jiashan (CN); Jian-Min Yu, Jiashan (CN)

(73) Assignees: FU DING ELECTRONICAL TECHNOLOGY (JIASHAN) CO.,LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 323 days.

(21) Appl. No.: 14/070,671

(22) Filed: Nov. 4, 2013

(65) Prior Publication Data

US 2014/0165371 A1 Jun. 19, 2014

(30) Foreign Application Priority Data

Dec. 19, 2012 (CN) .......................... 2012 1 05538524

(51) Int. Cl.
*B23P 13/02* (2006.01)
*B23P 23/02* (2006.01)
(Continued)

(52) U.S. Cl.
CPC .................. *B23P 23/02* (2013.01); *B23B 3/06* (2013.01); *B23B 5/36* (2013.01); *Y10T 29/49996* (2015.01);
(Continued)

(58) Field of Classification Search
CPC .............. B23P 23/02; B23B 5/36; B23B 3/06; Y10T 29/5173; Y10T 29/5174; Y10T 29/5171; Y10T 29/5168; Y10T 29/5172; Y10T 29/49998; Y10T 29/5109; Y10T 29/49996
See application file for complete search history.

(56) References Cited

FOREIGN PATENT DOCUMENTS

| CN | 101959639 A | 1/2011 |
|---|---|---|
| DE | 102009058649 A1 | 6/2011 |

(Continued)

*Primary Examiner* — John C Hong
(74) *Attorney, Agent, or Firm* — Zhigang Ma

(57) ABSTRACT

A method for machining a metallic member to provide a finished appearance uses a lathe and a milling process. A metallic member comprising a top portion and a peripheral sidewall is provided, the metallic member is positioned on the worktable. The worktable is rotated with the metallic member, the lathe tool moved backwards and forwards to machine the top portion of the rotary metallic member circumferentially. The lathe tool is moved by the moving device along a predetermined path relative to the worktable to machine curved surfaces of the top portion of the metallic member. After rotation, the milling cutter is rotated, and resists the peripheral sidewall of the metallic member. The milling cutter is moved along a predetermined path, and the milling cutter is fed the metallic member to achieve the required shape and finish.

10 Claims, 8 Drawing Sheets

(51) Int. Cl.
   *B23B 3/06* (2006.01)
   *B23B 5/36* (2006.01)
(52) U.S. Cl.
   CPC ....... *Y10T 29/49998* (2015.01); *Y10T 29/5109* (2015.01); *Y10T 29/5168* (2015.01); *Y10T 29/5171* (2015.01); *Y10T 29/5172* (2015.01); *Y10T 29/5173* (2015.01); *Y10T 29/5174* (2015.01)

(56) References Cited

FOREIGN PATENT DOCUMENTS

| | | |
|---|---|---|
| DE | 102011105402 A1 | 12/2012 |
| EP | 1952937 A1 | 8/2008 |
| TW | M355140 U | 4/2009 |
| TW | M427230 U1 | 4/2012 |

```
┌─────────────────────────────────────────────────────────────┐
│ Providing a machine comprising a machine support, a         │
│ worktable, a moving device, a lathe feeding mechanism,      │
│ and a milling feeding mechanism, wherein the worktable is   │
│ positioned on the machine support; the moving device is     │
│ slidably assembled to the machine support along a first     │
│ direction and located above the worktable, the lathe feeding│
│ mechanism and the milling feeding mechanism are slidably    │
│ assembled to the moving device along a second direction     │
│ perpendicular to the first direction, the lathe feeding     │
│ mechanism comprises at least one feeding assembly and a     │
│ lathe tool connected to the at least one feeding assembly,  │
│ the at least one feeding assembly is configured for driving │
│ the lathe tool to move along a third direction substantially│
│ perpendicular to the first and second direction reciprocally,│
│ the milling feeding mechanism comprises a milling cutter    │
│ and is configured for driving the milling cutter to move    │
│ along the third direction                                   │
└─────────────────────────────────────────────────────────────┘
                              ↓  ─── S101
┌─────────────────────────────────────────────────────────────┐
│ Positioning a metallic member on the worktable, the         │
│ metallic member comprising a top portion and a peripheral   │
│ sidewall extending from a peripheral edge of the top        │
│ portion                                                     │
└─────────────────────────────────────────────────────────────┘
                              ↓  ─── S102
┌─────────────────────────────────────────────────────────────┐
│ Applying the worktable to rotate with the metallic member   │
└─────────────────────────────────────────────────────────────┘
                              ↓  ─── S103
┌─────────────────────────────────────────────────────────────┐
│ Controlling the lathe tool to move backwards and forwards   │
│ toward the metallic member to machine the top portion of    │
│ the metallic member circumferentially                       │
└─────────────────────────────────────────────────────────────┘
                              ↓  ─── S104
┌─────────────────────────────────────────────────────────────┐
│ Moving the lathe tool by the moving device along a          │
│ predetermined path relative to the worktable to machine     │
│ curved surfaces of the top portion of the metallic member   │
└─────────────────────────────────────────────────────────────┘
                              ↓  ─── S105
┌─────────────────────────────────────────────────────────────┐
│ Holding the metallic member to stop rotate, and moving      │
│ the lathe tool away from the metallic member                │
└─────────────────────────────────────────────────────────────┘
                              ↓  ─── S106
┌─────────────────────────────────────────────────────────────┐
│ Driving the milling cutter to rotate, and to resist the     │
│ peripheral sidewall of the metallic member                  │
└─────────────────────────────────────────────────────────────┘
                              ↓  ─── S107
┌─────────────────────────────────────────────────────────────┐
│ Moving the milling cutter along a predetermined path,       │
│ simultaneously controlling a feed of the milling cutter     │
│ relative to the metallic member                             │
└─────────────────────────────────────────────────────────────┘
                                  ─── S108
```

FIG. 7

METHOD FOR MACHINING METALLIC MEMBER USING LATHING AND MILLING

CROSS-REFERENCE TO RELATED APPLICATIONS

This application claims all benefits accruing under 35 U.S.C. §119 from China Patent Application No. 201210553852.4, filed on Dec. 19, 2012, in the China Intellectual Property Office, the disclosure of which is incorporated herein by reference. The application is also related to co-pending applications entitled, "METHOD FOR MACHINING METALLIC MEMBER USING LATHING AND MILLING" (Ser. No. 14/070,681); "METHOD FOR MACHINING METALLIC MEMBER USING LATHING AND SCRAPING" (Ser. No. 14/070,688); "METHOD FOR MACHINING METALLIC MEMBER USING LATHING AND SCRAPING" (Ser. No. 14/070,694); "METHOD FOR MACHINING METALLIC MEMBER USING LATHING AND SCRAPING" (Ser. No. 14/070,699); "MACHINE TOOL WITH LATHE TOOL AND MILLING CUTTER" (Ser. No. 14/070,705); "MACHINE TOOL WITH LATHE TOOL AND SCRAPING CUTTER" (Ser. No. 14/070,717); "MACHINE CONTROL SYSTEM EMPLOYING LATHE TOOL AND MILLING CUTTER" (Ser. No. 14/070,722), "MACHINE CONTROL SYSTEM EMPLOYING LATHE TOOL AND SCRAPING CUTTER" (Ser. No. 14/070,728), "MILLING METHOD FOR MACHINING METALLIC MEMBER" (Ser. No. 14/070,736).

BACKGROUND

1. Technical Field

The present disclosure generally relates to methods for machining a metallic member, and particularly, to a method for machining member using lathing and milling.

2. Description of the Related Art

An electronic device such as a tabletop computer or a mobile phone, employs a metallic member as housing. The metallic member includes a top portion and a peripheral sidewall extending from a peripheral edge of the top portion. The top portion has a greater surface area than that of the peripheral sidewall. The peripheral sidewall has four side surfaces arranged in order and four corners each connecting two adjacent surfaces. In related manufacturing fields, if a milling process is employed to machine the metallic member, some tracks occur on the top portion that has been a milled because of intermittent contact and interrupted milling of the milling cutter. Then a polishing process needs to be applied for a better appearance, thus the efficiency of the milling process is reduced. If a lathe process is adopted to machine the metallic member, it is difficult to machine a surface which is not made for rotating. The lathe is not suitable to machine the peripheral sidewalls because of the four corners of the peripheral sidewall. Thus a number of additional machining processes must be added to machine the metallic member.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

FIG. 7 is a flow chart of a first embodiment of the method for machining the metallic member.

DETAILED DESCRIPTION

Figure 1:
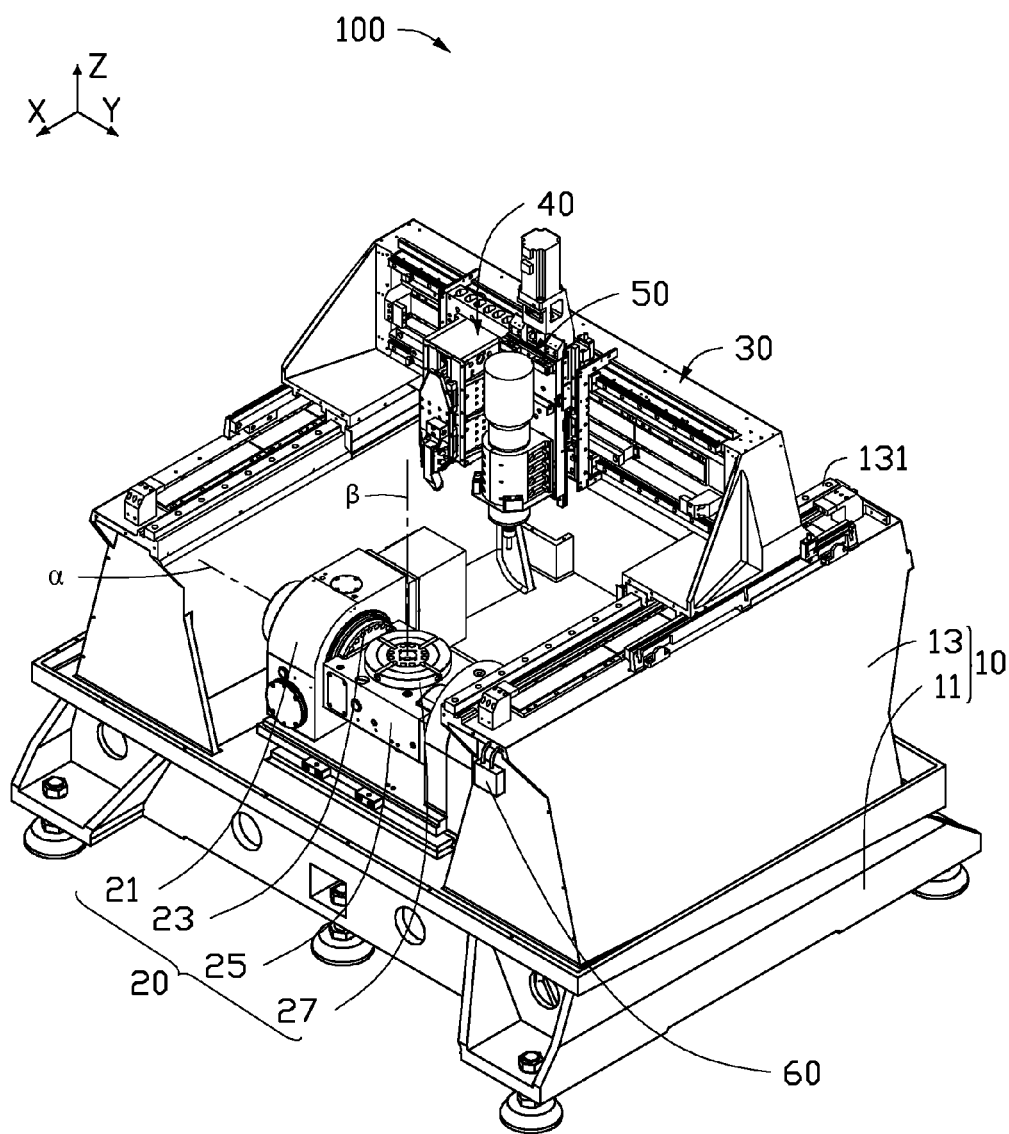
FIG. 1 is an isometric view of a first embodiment of a machine equipped with a lathe feeding mechanism and a milling feeding mechanism, and a worktable.
Figure 2:
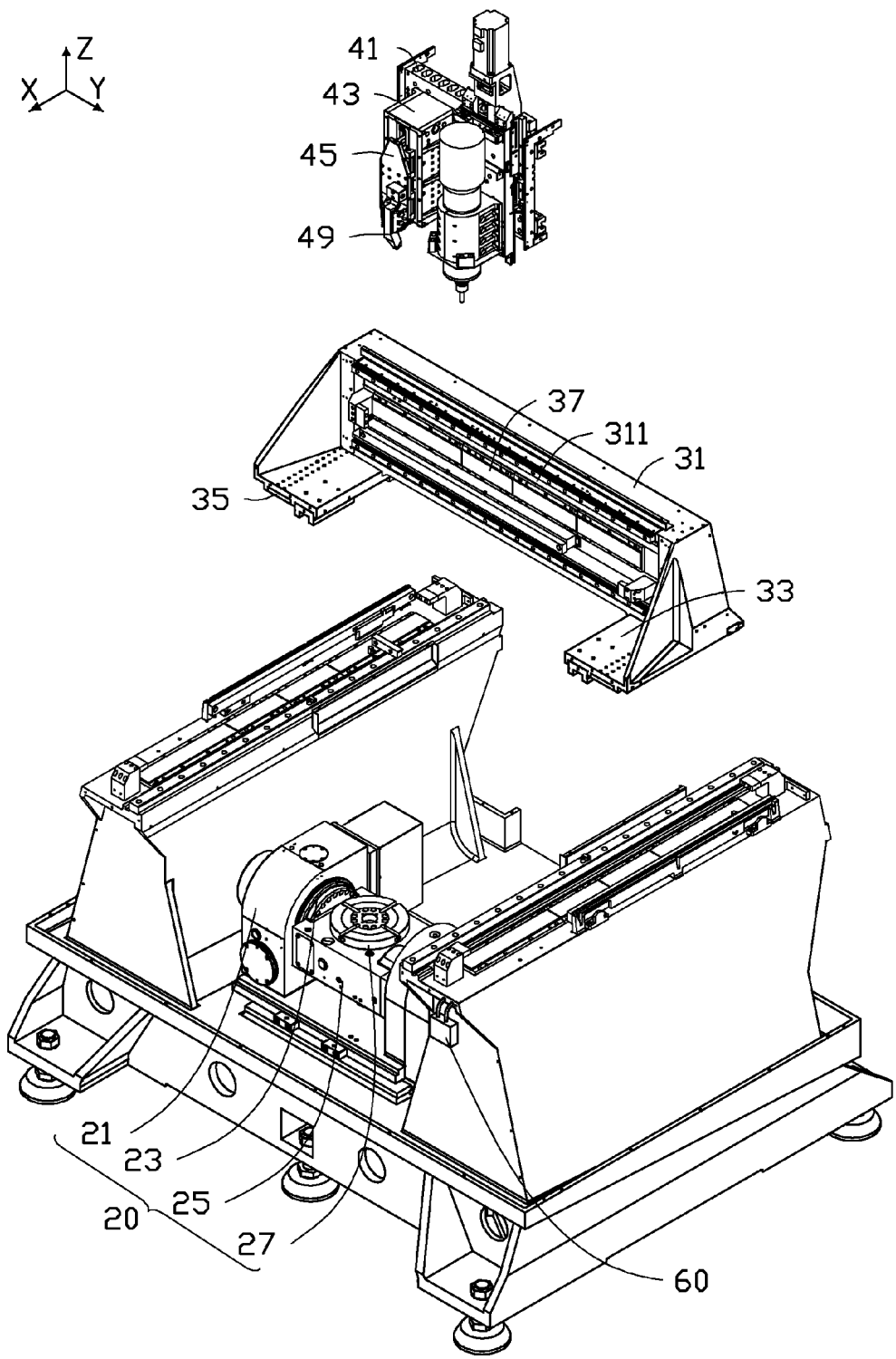
FIG. 2 is an exploded, isometric view of the machine of FIG. 1.
Figure 5:
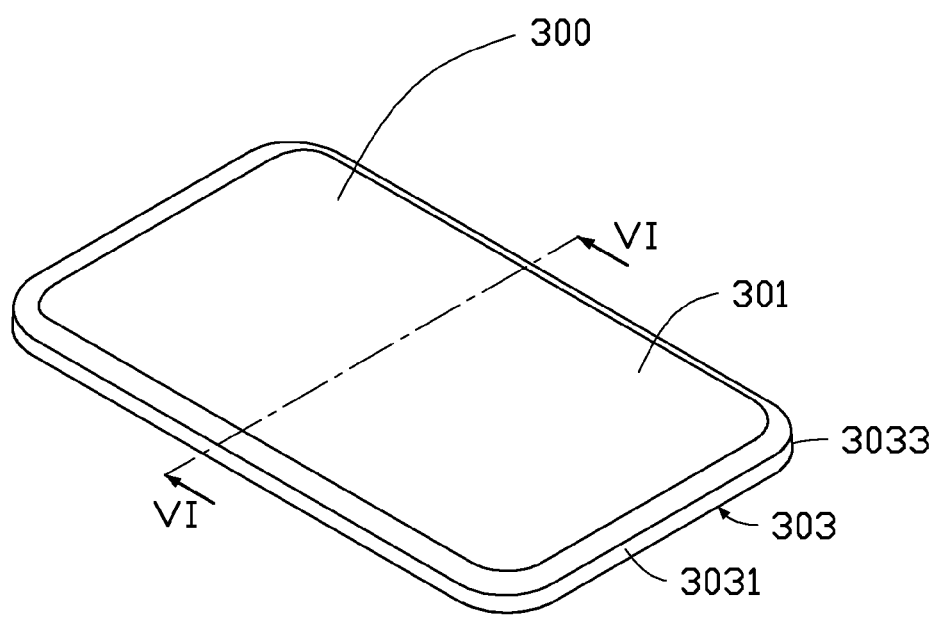
FIG. 5 is an isometric view of a metallic member to be machined.

FIGS. 1 and 2 show a first embodiment of a machine 100 adopting a method for machining a metallic member 300 (see FIG. 5). The machine 100 includes a machine support 10, a worktable 20, a moving device 30, a lathe feeding mechanism 40, a milling feeding mechanism 50, and a controller 60. The worktable 20 holds a workpiece in place and is supported by the machine support 10. The moving device 30 is movably positioned on the machine support 10 above the worktable 20. The lathe feeding mechanism 40 and the milling feeding mechanism 50 are arranged side by side and slidably mounted on the moving device 30. The controller 60 is electrically connected to the worktable 20, the moving device 30, the lathe feeding mechanism 40, and the milling feeding mechanism 50 for controlling the machine 100. Under the control of the controller 60, the moving device 30 can be driven to move with the lathe feeding mechanism 40 and the milling feeding mechanism 50, such that the lathe feeding mechanism 40 and the milling feeding mechanism 50 can be driven three-dimensionally along Cartesian coordinates, that is, along the X, the Y, and the Z axes.

The machine support 10 includes a base 11 and a pair of support bodies 13 positioned on the base 11. The pair of support bodies 13 is parallel to each other and arranged apart from each other. Each support body 13 includes a first sliding rail 131 on a surface away from the base 11. In the illustrated embodiment, the first sliding rail 131 extends substantially parallel to the X-axis (a first direction).

The worktable 20 is rotatably positioned on the base 11 between the two support bodies 13. The worktable 20 includes a pair of mounting bases 21, a first rotating member 23, a rotating shaft 25, and a second rotating member 27. The pair of mounting bases 21 is located in the middle portion of the base 11, in parallel. The pair of mounting bases 21 is located between the two support bodies 13. The first rotating member 23 is mounted on one mounting base 21. The rotating shaft 25 interconnects the first rotating member 23 and the other one mounting base 21. The first rotating member 23 is capable of rotating the rotating shaft 25 around an α axis. The α axis is parallel to the Y-axis but not co-linear (a second direction). The second rotating member 27 is positioned on a middle portion of the rotating shaft 25, and capable of rotating the metallic member 300 placed thereupon around an β axis. The β axis is parallel to the Z-axis (a third direction) but not co-linear. The first rotating member 23 and the second rotating member 27 are electrically connected to the controller 60. In the illustrated embodiment, the first rotating member 23 and the second rotating member 27 are direct drive motors.

The moving device 30 is slidably mounted on the pair of support bodies 13 and located above the worktable 20. The moving device 30 includes a cross beam 31, a pair of sliding bases 33, a pair of first driving mechanisms 35, and a second driving mechanism 37. The extending direction of the cross beam 31 is substantially parallel to the Y-axis. Opposite ends of the cross beam 31 are slidably positioned on the support bodies 13. The cross beam 31 includes a pair of second sliding rails 311 positioned on a side surface thereof and extending substantially parallel to the Y-axis. The pair of sliding bases 33 is installed on the opposite ends of the cross beam 31 to slidably connect with the first sliding rail 131. The first driving mechanism 35 is mounted on a surface of the sliding base 33 away from the cross beam 31 and located adjacent to an end of the first sliding rail 131. The pair of first driving mechanism 35 is employed to drive the cross beam 31 to move along the X-axis direction.

The second driving mechanism 37 is mounted on the cross beams 31 to drive the lathe feeding mechanism 40 and the milling feeding mechanism 50 to move along the second sliding rails 311. The first driving mechanism 35 and the second driving mechanism 37 are electrically connected to the controller 60. In the illustrated embodiment, the first driving mechanisms 35 and the second driving mechanism 37 are linear motors with wonderful performance. In other embodiments, the first driving mechanisms 35 and the second driving mechanism 37 may be other drivers, such as hydraulic cylinders or rams. The number of the first driving mechanisms 35, and the second driving mechanism 37 may be set according to the application.

Figure 3:
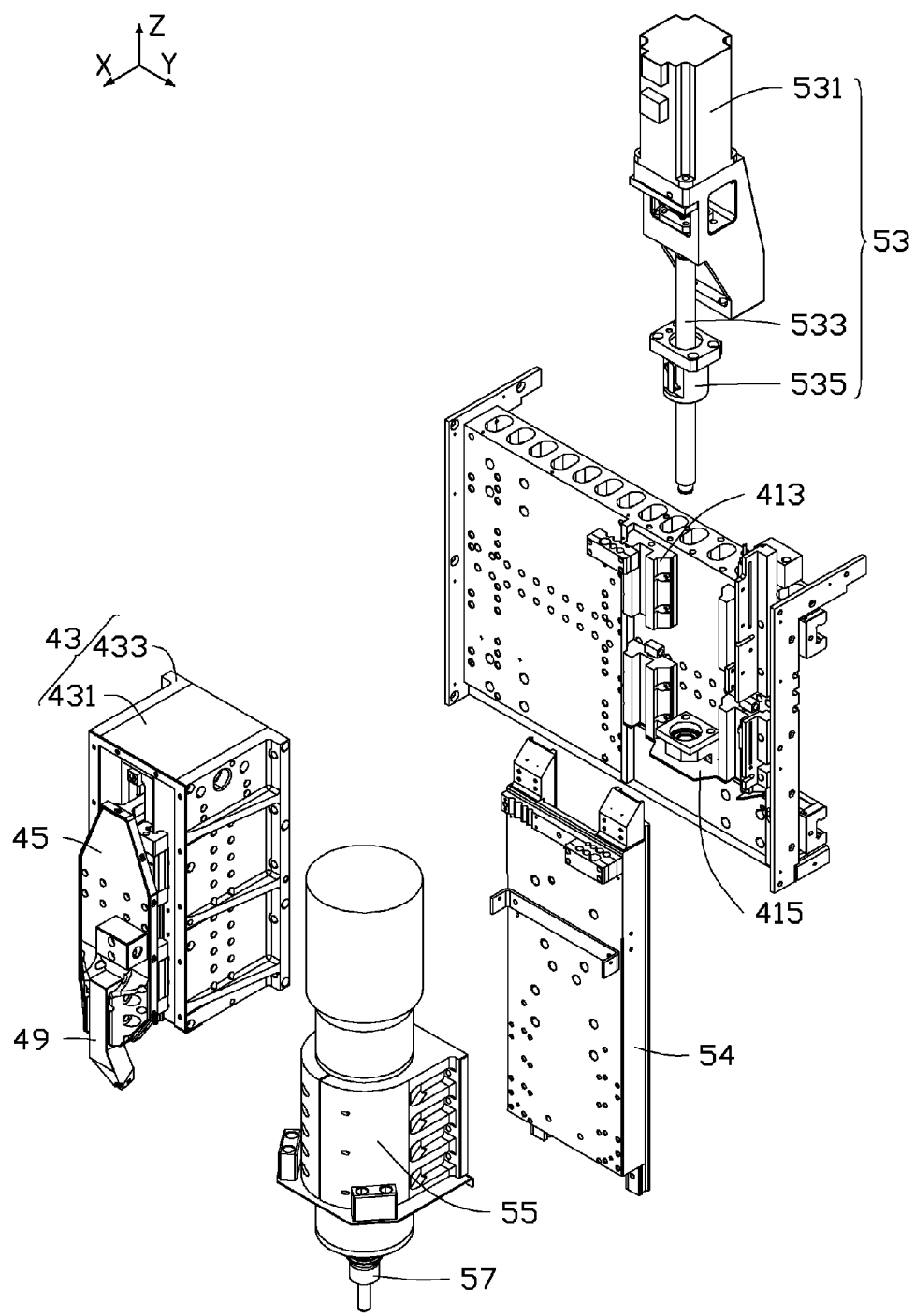
FIG. 3 is a partial, exploded, isometric view of the lathe feeding mechanism and the milling feeding mechanism of FIG. 2.
Figure 4:
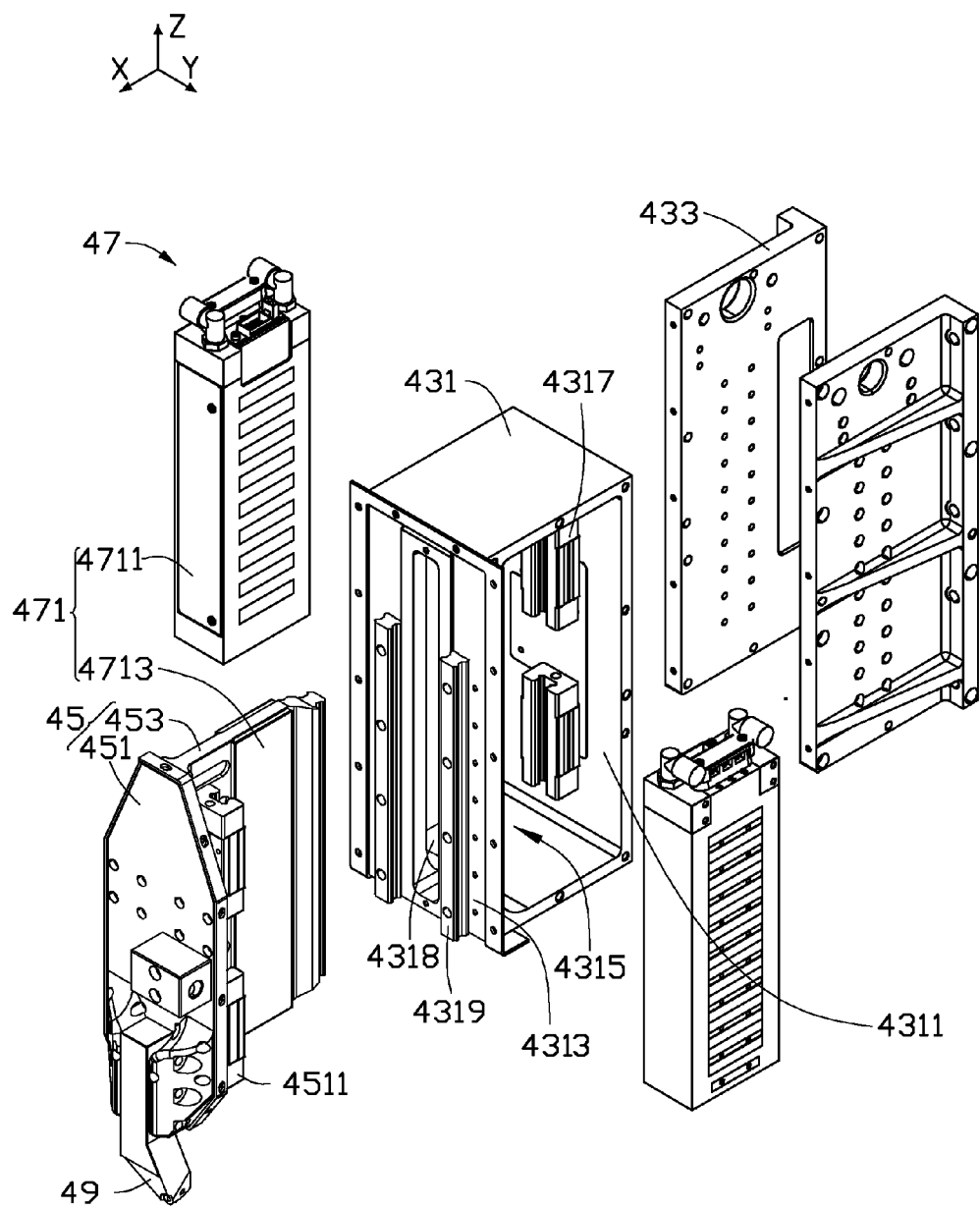
FIG. 4 is an exploded, isometric view of the lathe feeding mechanism of FIG. 3.

FIGS. 3 to 4 show the lathe feeding mechanism 40 slidably positioned on the cross beams 31. The lathe feeding mechanism 40 includes a sliding saddle 41 (see FIG. 2), a mounting seat 43, a tool holder 45, a pair of feeding assemblies 47, and a lathe tool 49. The sliding saddle 41 is assembled to the cross beams 31 and movably engages with the pair of second sliding rails 311. The sliding saddle 41 is driven by the second driving mechanism 37 to slide along the Y-axis direction together with the lathe feeding mechanism 40 and the milling feeding mechanism 50. The mounting seat 43 is fitted to the sliding saddle 41 away from the cross beam 31 and equipped with four guiding rails 413 extending along the Z-axis direction. The four guiding rails 413 are divided in two sets spaced from each other by two-two type. The sliding saddle 41 further includes a mounting block 415 adjacent to the base 11. The mounting block 415 is located between the two sets of guiding rails 413. The mounting seat 43 is assembled to the sliding saddle 41 and spaced from the four guiding rails 413.

The mounting seat 43 includes a frame 431 and two mounting boards 433 assembled to opposite sides of the frame 431. The frame 431 includes a first side wall 4311 and a second side wall 4313. The first side wall 4311 and the second side wall 4313 are positioned substantially parallel to each other and cooperatively define a receiving space 4315. The first side wall 4311 is slidably connected with the sliding saddle 41. Two separate guiding portions 4317 protrude from an inner surface of the first side wall 4311 facing toward the second side wall 4315 and extend substantially parallel to the Z-axis. A through groove 4318 is defined in the second side wall 4313 and extends along a direction substantially parallel to the Z-axis corresponding to the guiding portions 4317. Two sliding portions 4319 protrude from an outer surface of the second side wall 4313 at two sides of the through groove 4318. In the illustrated embodiment, the sliding portions 4319 are sliding rails, and the frame 431 is integrally formed. The two mounting boards 433 are installed on two opening sides of the frame 431. Each mounting board 433 is connected substantially perpendicularly to the first wall 4311 and the second side wall 4313 to close the two opening sides of the frame 431.

The tool holder 45 slidably connects with the mounting seat 43. The tool holder 45 is substantially "T" shaped, and includes a main body 451 and a sliding board 453 protruding substantially perpendicularly from the main body 451. The main body 451 is a bar of material tapering at both ends, and positioned outside of the mounting seat 43. Two distanced holding portions 4511 are positioned on a surface of the main body 451 facing the sliding board 453. The two holding portions 4511 slidably engage with the pair of sliding portions 4319 of the mounting seat 43. The sliding board 453 passes through the through groove 4318 and is slidably assembled to the two guiding portions 4317, dividing the receiving space 4315 into two parts.

The pair of feeding assemblies 47 is mounted in the mounting seat 43, and includes two drivers 471 electrically connected to the controller 60. The two drivers 471 are capable of driving the tool holder 45 into a reciprocating motion at a high speed along the direction of the Z-axis, relative to the guiding portions 4317 and the sliding portions 4319. The two drivers 471 are received in the receiving space 4315 and positioned on two sides of the sliding board 453. In the illustrated embodiment, the drivers 471 are linear motors. Each driver 471 includes a forcer 4711 and a stator 4713. Each forcer 4711 is fixed to a surface of each of the mounting boards 433. The sliding board 453 is positioned between the two forcers 4711. The two stators 4713 are positioned on the opposite surfaces of the sliding board 453. In other embodiments, the number of drivers 471 may be set according to application. For example, the two drivers 471 can replace a single driver with more power, or three or more drivers can be positioned to drive the tool holder 45 to maximize the available power, and the assembly of the drivers is simpler.

The lathe tool 49 is fixedly assembled to the main body 451 of the tool holder 4511 adjacent to the base 11.

The milling feeding mechanism 50 includes a linear driving assembly 53, a linking board 54, a rotatable driving member 55 and a milling cutter 57. The linear driving assembly 53 includes a driving member 531, a screw leading rod 533, and a nut 535. The driving member 531 is mounted on the sliding saddle 43 above the cross beam 31. The screw leading rod 533 interconnects the driving member 531 and the mounting block 415. The nut 535 is sleeved on the screw leading rod 533 and engages with the screw leading rod 533. The linking board 54 is slidably assembled to the two sets of guiding rails 413 and fixed to the nut 535. The rotatable driving member 55 is assembled to a side surface of the linking board 54 opposite to the screw leading rod 533. The milling cutter 57 is mounted on an end of the rotatable driving member 55 adjacent to the base 11.

The driving member 531 is capable of rotating the screw leading rod 533 and drives the linking board 54, the rotatable driving member 55, and the milling cutter 57 to slide along Z-axis direction. The rotatable driving member 55 is capable of rotating the milling cutter 57 to mill the metallic member 300. The milling cutter 57 is driven by the cross beam 31 to move along the X-axis direction or the Y-axis direction, and driven by the linear driving assembly 53 to move along Z-axis direction.

In assembly, the worktable 20 is positioned between the two support bodies 13. The cross beam 31 is installed on the two support bodies 13 via the pair of sliding bases 33. The pair of first driving mechanisms 35, and the second driving mechanism 37 are mounted on the base 11 and the cross beam 31, respectively. The lathe feeding mechanism 40 and the milling feeding mechanism 50 are mounted to the cross beam 31 side by side. The worktable 20, the moving device 30, the lathe feeding mechanism 40, and the milling feeding mechanism 50 are electrically connected to the controller 60.

Figure 6:
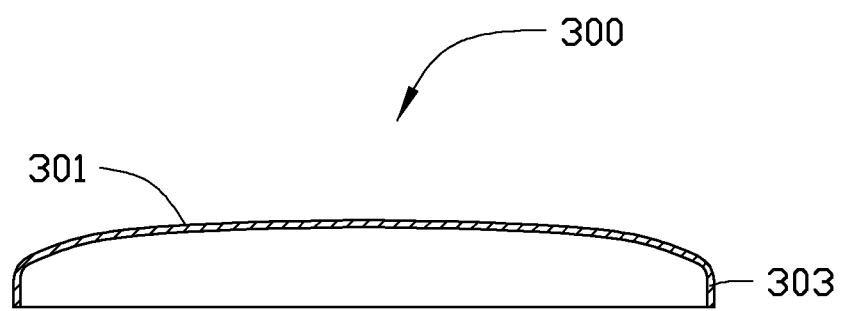
FIG. 6 is a sectional view of the metallic member of FIG. 5, taken along line VI-VI of FIG. 5.

Referring to FIGS. 5 and 6, the metallic member 300 to be machined is a housing of a tablet computer or a mobile phone. The metallic member 300 is substantially rectangular, and includes a top portion 301 and a peripheral sidewall 303 extending from a peripheral edge of the top portion 301. The top portion 301 has a non-symmetrical curved surface with a relatively greater surface area than that of the peripheral sidewall 303. In the embodiment, the peripheral sidewall 303 has four side surfaces 3031 arranged in order and adjacent two of the four side surfaces 3031 is connected by a corner 3033. The four side surfaces 3031 are substantially planar surfaces, each corner 3033 interconnects two adjacent side surfaces 3031.

Referring to FIG. 7, an embodiment of a method for machining the metallic member includes steps as follows:

In step S101: a machine 100 is provided, the machine 100 includes a worktable 20, a lathe feeding mechanism 40, and a milling feeding mechanism 50, the lathe feeding mechanism 40 includes a lathe tool 49, and the milling feeding mechanism 50 includes a milling cutter 57. In the embodiment, the machine 100 is provided as previously described.

In step S102: a metallic member 300 is placed and held on the worktable 20. The metallic member 300 includes a top portion 301 and a peripheral sidewall 303 extending from a peripheral edge of the top portion 301. If the metallic member 300 is readily available, step S102 may be omitted.

In step S103: the worktable 20 drives the metallic member 300 to rotate. In the embodiment, the metallic member 300 is driven by the second rotating member 27 to rotate around the β axis;

In step S104: the lathe feeding mechanism 40 drives the lathe tool 49 to machine the top portion 301 of the metallic member 300 reciprocally at a high frequency. In detail, firstly, the pair of first driving mechanisms 35 drives the cross beam 31 to slide along the X-axis, and the second driving mechanism 37 drives the lathe feeding mechanism 40 to move along the Y-axis, until the lathe tool 49 arrives at an original position above the worktable 20 for machining. In the embodiment, the original position is located above a middle portion of the metallic member 300. Finally, the pair of feeding assemblies 47 drives the lathe tool 49 to move backwards and forwards at a high speed along the Z-axis according to the depth of cutting required for each machining portion of the top portion 301 to machine the metallic member 300 circumferentially.

In step S105: the lathe feeding mechanism 40 moves along a predetermined path relative to the worktable 20. The first driving mechanism 25 drives the feeding mechanism 40 to move along the X-axis via the cross beam 31, such that the rotary lathe tool 49 moves in the radial direction of the metallic member 300 for machining curved surfaces on the top portion 301.

In step S106: the worktable 20 drives the metallic member 300 to stop the rotating motion, the lathe tool 49 moves away from the metallic member 300. That is, the second rotating member 27 stops the rotating motion, to hold the metallic member 300, and the lathe feeding mechanism 40 drives the lathe tool 49 to leave the worktable 20.

In step S107: the milling feeding mechanism 50 drives the milling cutter 57 to rotate and resist the peripheral sidewall 303 of the metallic member 300. In detail, firstly, the pair of first driving mechanisms 35 drives the cross beam 31 to slide along the X-axis, and the second driving mechanism 37 drives the lathe feeding mechanism 40 to move along the Y-axis, such that the milling cutter 57 arrives at a position above an end of one side surface 3031 of the peripheral sidewall 303. Secondly, the rotatable driving member 55 drives the milling cutter 57 to rotate. Finally, the linear driving assembly 53 drives the milling cutter 57 to slide along the two sets of guiding rails 413 until the milling cutter 57 resists the peripheral sidewall 303 of the metallic member 300.

In step S108: the milling feeding mechanism 50 moves along a predetermined path and controls a feed of the milling cutter 57 relative to the metallic member 300. In detail, the pair of first driving mechanisms 35 drives cross beam 31 to slide along the X-axis to enable the milling cutter 57 to mill one side surface 3031 of the peripheral sidewall 303. When milling of the side surface 3031 is finished, the milling cutter 57 arrives at the corner 3033. At the time, the second rotating member 27 rotates the metallic member 300 around the β axis until one adjacent side surface 3031 of the peripheral sidewall 300 rotates to milling cutter 57.

In the rotating process, the milling cutter 57 is driven by the pairs of the first driving mechanisms 35 and the second driving mechanisms 37 to change position relative to the metallic member 300, and the milling cutter 57 machines the corner 3033 during the rotation motion. When the adjacent side surface 3031 of the peripheral sidewall 303 is rotated to a position parallel to the pair of first sliding rail 131, the pair of first driving mechanisms 35 drives the cross beam 31 to slide along the X-axis to enable the milling cutter 57 to mill the adjacent side surface 3031. During the milling, feeding mechanism 50 moves along the predetermined path, the rotatable driving member 55 controls a feed of the milling cutter 57 relative to the metallic member 300 along the Z-axis direction. In another embodiment, the metallic member 300 is fully fixed, thus when the milling cutter 57 arrives at the corner 3033, it is driven by the pairs of the first driving mechanisms 35 and the second driving mechanisms 37 to change position relative to the metallic member 300. During the rotating process, the milling cutter 59 machines the corner 3033 until it arrives at the adjacent side surface 3031 of the metallic member 300. Then the milling cutter 57 mills the adjacent side surface 3031 of the peripheral sidewall 303 by a similar process.

Figure 8:
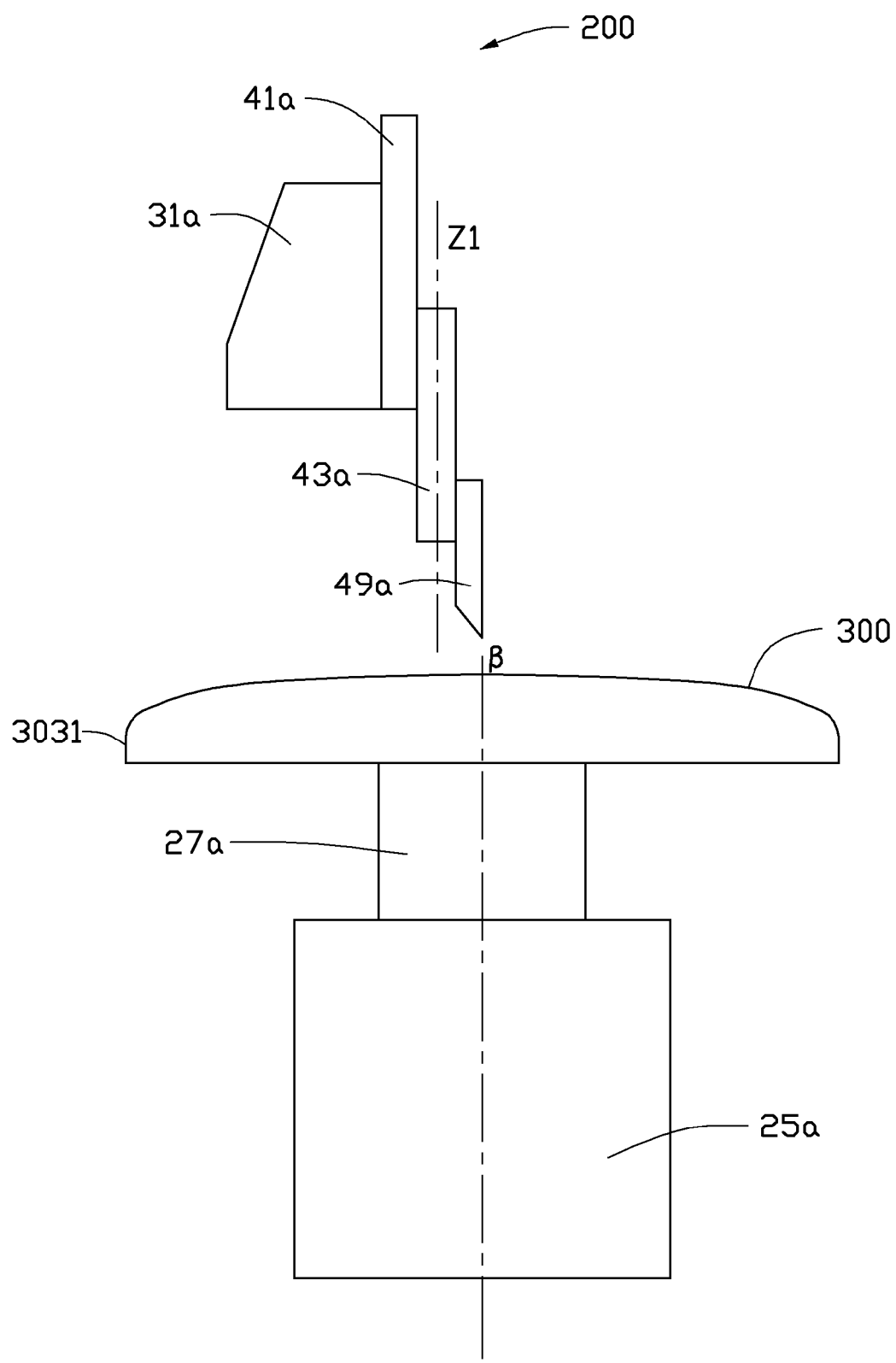
FIG. 8 is a schematic view of a second embodiment of the machine with a part thereof removed.

Referring to FIG. 8, a second embodiment of machine 200 employed in a second embodiment of method for machining the metallic member 300. The machine 200 is similar to the machine 100 in structure, a sliding saddle 41a is slidably assembled to a cross beam 31a, and a second rotating member 27a is mounted on a rotating shaft 25a. The metallic member 300 is placed and held on the second rotating member 27a. The difference between the machine 100/200 is that, a mounting seat 43a of the machine 200 is slidably mounted on the sliding saddle 41a and capable of sliding along the Z1-axis direction relative to the sliding saddle 41a, and a lathe tool 49a is slidably mounted on the mounting seat 43a.

When the lathe feeding mechanism 40 is to machine the top portion 301 of the metallic member 300, the pair of first driving mechanisms 35 drives the cross beam 31 to slide along the X-axis, and the second driving mechanism 37 drives the lathe feeding mechanism 40 to move along the Y-axis, such that the lathe tool 49a arrives at an original position above the worktable 20 for machining. Then the mounting seat 43a drives the lathe tool 49a to move downward along the Z1-axis to reach a preset position near the middle portion of the metallic member 300. Finally, the pair of feeding assemblies 47 drives the lathe tool 49a to move backwards and forwards at a high speed along the Z-axis according to the depth of cutting required for each machining portion of the top portion 301 to machine the rotary metallic member 300 circumferentially. Because the mounting seat 43a can slide along the Z1-aixs to place the lathe tool 49a at the preset position, a reciprocally moving distance of the lathe tool 49 relative to the metallic member 300 can be reduced, thereby enhancing a reaction response of the lathe tool 49a.

Accordingly, in the second embodiment of the method for machining the metallic member 300, after driving the cross beam 31 to slide along the Y-axis by the second driving mechanisms 37, a step of moving the mounting seat 43a downward along the Z1-axis direction to reach a preset position is interposed.

The lathe feeding mechanism 40 of the machine 100 is employed in the method for machining the top portion 301 the metallic member 300. The lathe feeding mechanism 40 is capable of moving along the X-axis direction and the Y-axis direction via the moving device 30, and being fed into the work at high speed in the Z-axis. Because the cutting depths of the rotary metallic member 300 along the Z-axis are different, the three dimensional curved surface will be machined. With the combination of the rotation of the worktable 20 rotating the second rotating member 27, the high speed feeding of the lathe feeding mechanism 40 moving backwards and forwards along the Z-axis, and the moving of the lathe feeding mechanism 40 along the Y-axis relative to the worktable 20, the three dimensional curved surface achieves a quality appearance without the need for additional surface processing, such as polishing, thereby improving machining efficiency.

As the milling feeding mechanism 50 is located at the sliding saddle 41 together with the lathe feeding mechanism 40, the milling feeding mechanism 50 machines the peripheral sidewall 303 of the metallic member 300 after the lathe feeding mechanism 40 has machined the top portion 301 of the metallic member 300, such that a releasing and a clamping of the metallic member 300 to undergo other surface processing is omitted, thus a machining precision, an efficiency and a qualify of the metallic member 300 in undergoing the machining process are all improved. Because the moving device 30 is capable of moving the lathe feeding mechanism 40 and the milling feeding mechanism 50 along the X-axis, and the Y-axis, the lathe feeding mechanism 40 and the milling feeding mechanism 50 are capable of driving the lathe tool 49 and the milling cutter 59 to slide along the Z-axis, furthermore, the metallic member 300 is driven by the worktable 20 to rotate around β axis, such that the machining method is more favorable for surface machining.

The milling feeding mechanism 50 may mill the peripheral sidewall 303 of the metallic member 300 before the lathe feeding mechanism 40 machines the top portion 301. The milling feeding mechanism 50 is not assembled to the sliding saddle 41, but is assembled to a sliding plate (not shown) slidably mounted on the pair of second guiding rails 311, such that the lathe feeding mechanism 40 and the milling feeding mechanism 50 may be controlled independently.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A method for machining metallic member using lathing and milling, comprising:
    (1) providing a machine comprising a machine support, a worktable, a moving device, a lathe feeding mechanism, and a milling feeding mechanism, wherein the worktable is positioned on the machine support; the moving device is slidably assembled to the machine support along a first direction and located above the worktable, the lathe feeding mechanism and the milling feeding mechanism are slidably assembled to the moving device along a second direction perpendicular to the first direction, the lathe feeding mechanism comprises at least one feeding assembly and a lathe tool connected to the at least one feeding assembly, the at least one feeding assembly is configured for driving the lathe tool to move along a third direction substantially perpendicular to the first and second direction reciprocally, the milling feeding mechanism comprises a milling cutter and is configured for driving the milling cutter to move along the third direction, the worktable comprising a first rotating member, a rotating shaft, and a second rotating member, the first rotating member is mounted on the machine support through the rotating shaft, the second rotating member is positioned on a middle portion of the rotating shaft, the second rotating member is configured to rotate the metallic member along the third direction to cooperative with the lathe tool and the milling cutter;
    (2) positioning a metallic member on the worktable, the metallic member comprising a top portion and a peripheral sidewall extending from a peripheral edge of the top portion, wherein the peripheral sidewall comprises a plurality of side surfaces arranged in order and adjacent two of the plurality of side surfaces is connected by a corner;
    (3) applying the worktable to rotate with the metallic member;
    (4) controlling the lathe tool to move backwards and forwards toward the metallic member to machine the top portion of the metallic member circumferentially;
    (5) moving the lathe tool by the moving device along a predetermined path relative to the worktable to machine curved surfaces of the top portion of the metallic member;
    (6) holding the metallic member to stop rotate, and moving the lathe tool away from the metallic member;
    (7) driving the milling cutter to rotate, and to resist the peripheral sidewall of the metallic member;
    (8) moving the milling cutter along a predetermined path, simultaneously controlling a feed of the milling cutter relative to the metallic member, when the milling cutter finishes milling one side surface, the milling cutter arrives at one corner of the peripheral sidewall, the moving device drives the milling feeding mechanism to move along the first direction and the second direction to adjust a position of the milling cutter relative to the metallic member, and the second rotating member rotates the metallic member along the third direction until one adjacent side surface of the peripheral sidewall is rotated adjacent to the milling cutter.

2. The method of claim 1, further comprising, while adjusting the position of the milling cutter relative to the metallic member, continuing machining the corner by the milling cutter until the milling cutter arrives at the adjacent side surface, and followed by repeating the machining steps on the adjacent side surface.

3. The method of claim 1, wherein the peripheral sidewall comprises a plurality of side surfaces arranged in order and adjacent two of the plurality of side surfaces is connected by a corner, step (8) further comprises when the milling cutter finishes milling one side surface, the milling cutter arrives at one corner of the peripheral sidewall, the moving device drives the milling feeding mechanism to move along the first direction and the second direction, simultaneously rotating the metallic member with the worktable, thereby cooperatively adjusting a position of the milling cutter relative to the metallic member, then the milling cutter arrives at an adjacent side surface to the side surface that has been milled.

4. The method of claim 3, wherein in the process of adjusting the position of the milling cutter relative to the metallic member, the milling cutter machines the corner till the milling cutter arrives at the adjacent side surface, and followed by repeating the machining steps on the adjacent side surface.

5. The method of claim 1, wherein in the step (4), the moving device first drives the lathe feeding mechanism to slide along the first direction and the second direction until the lathe tool arrives at an original position above the worktable; then the at least one feeding assembly drives the lathe tool to move backwards and forwards along the third direction according to a depth of cutting required for each machining portion of the top portion.

6. The method of claim 5, wherein the lathe feeding mechanism further comprises a sliding saddle and mounted seat fittingly assembled to the sliding saddle, the sliding saddle is slidably connected to the moving device along the second direction, the at least one feeding assembly is received in the mounting seat, and the milling cutter is slidably mounted on the mounting seat.

7. The method of claim 5, wherein the lathe feeding mechanism further comprises a sliding saddle and a mounted seat, the sliding saddle is slidably connected to the moving device along the second direction, the mounting seat is slidably mounted on the sliding saddle along a fourth direction substantially parallel to the third direction, the at least one feeding assembly is received in the mounting seat, and the milling cutter is slidably mounted on the mounting seat; step (4) further comprises, after the lathe tool arrives at the original position above the worktable, the mounting seat is controlled to drive the lathe tool to move along the fourth direction to reach a preset position near the metallic member, then the at least one feeding assembly drives the lathe tool to move backwards and forwards.

8. The method of claim 7, wherein the milling feeding mechanism comprises a linear driving assembly mounted on the moving device, the linear driving assembly drives the milling cutter to move along the third direction to adjust the feed of the milling cutter relative to the metallic member.

9. The method of claim 8, wherein the milling feeding mechanism further comprises a linking board, and a rotatable driving member configured for rotating the milling cutter, the linear driving assembly is mounted on the sliding saddle and located adjacent to the mounting seat, the linking board is slidably assembled to the sliding saddle and driven by the linear driving assembly, the milling cutter is mounted on an end of the rotatable driving member.

10. The method of claim 9, wherein the lathe feeding mechanism further comprises a tool holder slidably connects with the mounting seat, the tool holder comprises a main body and a sliding board protruding substantially perpendicularly from the main body, the main body is positioned out of the mounting seat, the sliding board is received in the mounted seat, the main body comprises two separated holding portions positioned on a surface thereof facing the sliding board, the mounting seat comprises two sliding portions protruding from an outer surface thereof, each of the two holding portions slidably engages with each of the two sliding portions of the mounting seat, the lathe tool is fixed on the tool holder.

* * * * *